United States Patent [19]

Baker et al.

[11] 4,398,241

[45] Aug. 9, 1983

[54] DIGITAL CONTROL CIRCUIT FOR AN ANALOG SERVO

[75] Inventors: Elwood B. Baker, Endwell; James A. Turner, Binghamton, both of N.Y.

[73] Assignee: The Singer Company, Binghamton, N.Y.

[21] Appl. No.: 176,214

[22] Filed: Aug. 7, 1980

[51] Int. Cl.³ .................. G05B 17/02; G06F 15/46
[52] U.S. Cl. .................. 364/167; 318/601; 364/174; 364/183; 434/49
[58] Field of Search .............. 364/118, 108, 110, 419, 364/578, 424, 443, 805, 602, 167, 174, 183; 318/580, 562, 600, 601, 604, 584, 585, 586; 434/29, 30, 31, 35, 49, 51, 62

[56] References Cited

U.S. PATENT DOCUMENTS

| | | | |
|---|---|---|---|
| 3,363,331 | 1/1968 | Hunt | 434/49 |
| 3,777,128 | 12/1973 | Kirkham | 364/118 X |
| 3,958,109 | 5/1976 | Doherty et al. | 364/118 X |
| 4,093,904 | 6/1978 | Burig et al. | 364/174 X |
| 4,187,546 | 2/1980 | Heffernan et al. | 364/174 X |
| 4,236,325 | 12/1980 | Hall et al. | 434/45 |
| 4,245,297 | 1/1981 | Bertram | 364/118 |
| 4,245,298 | 1/1981 | Slater | 364/118 |

Primary Examiner—Joseph F. Ruggiero
Attorney, Agent, or Firm—Douglas M. Clarkson; Jeff Rothenberg

[57] ABSTRACT

This disclosure describes digital control circuit to actuate an analog servo motor in response to digital information from a computer. The control circuit is responsive to the timing signal (13) from the computer, and includes a circuit (12) to receive information from the computer indicative of a new servo position. A feedback circuit (15) receives information from the servo indicative of the actual present servo position. Information processed individually by each of these circuits then is connected into a computational network (14) in order to generate a properly timed digital output signal which, when converted in a suitable digital-to-analog converter (17), is able to drive a servo motor accurately.

6 Claims, 4 Drawing Figures

DIGITAL CONTROL CIRCUIT FOR AN ANALOG SERVO

The United States Government has rights in this invention under a contract F33657-78-C-0592 with the Department of the Air Force.

BACKGROUND OF THE INVENTION

This invention, generally, relates to the field of simulation and, more particularly, to a new and improved control circuit for actuating a servo motor.

It is well known that an electrical servo usually operates from analog signal inputs. However, present day simulators are driven by computer, which means that the signals available to control such an electrical servo are digital in form.

Previous experience with servo controls in the computer field has indicated that digital data can be modified with greater accuracy than can analog data, and in addition, digital data has a higher immunity to noise. Whenever a circuit is designed for control purposes, therefore, it is preferrably in the digital format.

In a servo for use in the simulator field, there is a requirement for control which far exceeds the normal control in usual usage. For example, such control in a simulator must be finite, rapid and continuous to afford the kind of effectiveness required in this field.

INVENTION SUMMARY

Accordingly, a principal object of the present invention is to provide a servo control circuit operable directly from a digital computer.

It is also an object of the invention to provide a servo control circuit for operating with finer control, increased resolution in a manner that is more exact and precise than any control circuit available heretofor.

A control circuit to actuate an analog electrical servo in response to digital information, in accordance with the principles of the present invention, includes means to receive a digital signal in order to initiate movement in the servo drive device. The means to receive digital information from the computer, which is indicative of servo position and servo velocity of movement, are separate from each other so that better control and adjustments can be had.

Response means receives information from the servo which is indicative of the actual servo position, and a feedback circuit includes separate means for receiving a response signal, as well as a clock pulse from the computer, so that feedback information is properly timed with the other controls from the computer. An overall computational circuit receives all of these signals and generates a digital output signal responsive thereto, which can be converted to an analog signal to actuate the servo in a predetermined manner.

THE DRAWINGS

The foregoing, other and further objects, features and advantages of the present invention will appear more fully from the detailed description of the presently preferred embodiment of the invention and from the claims appended hereto, when viewed in conjunction with the accompanying drawings, in which:

FIGS. 2, 2a and 2b are a circuit diagram in more detail showing respective component parts in order to achieve the above-described control.

DETAILED DESCRIPTION

Figure 1:
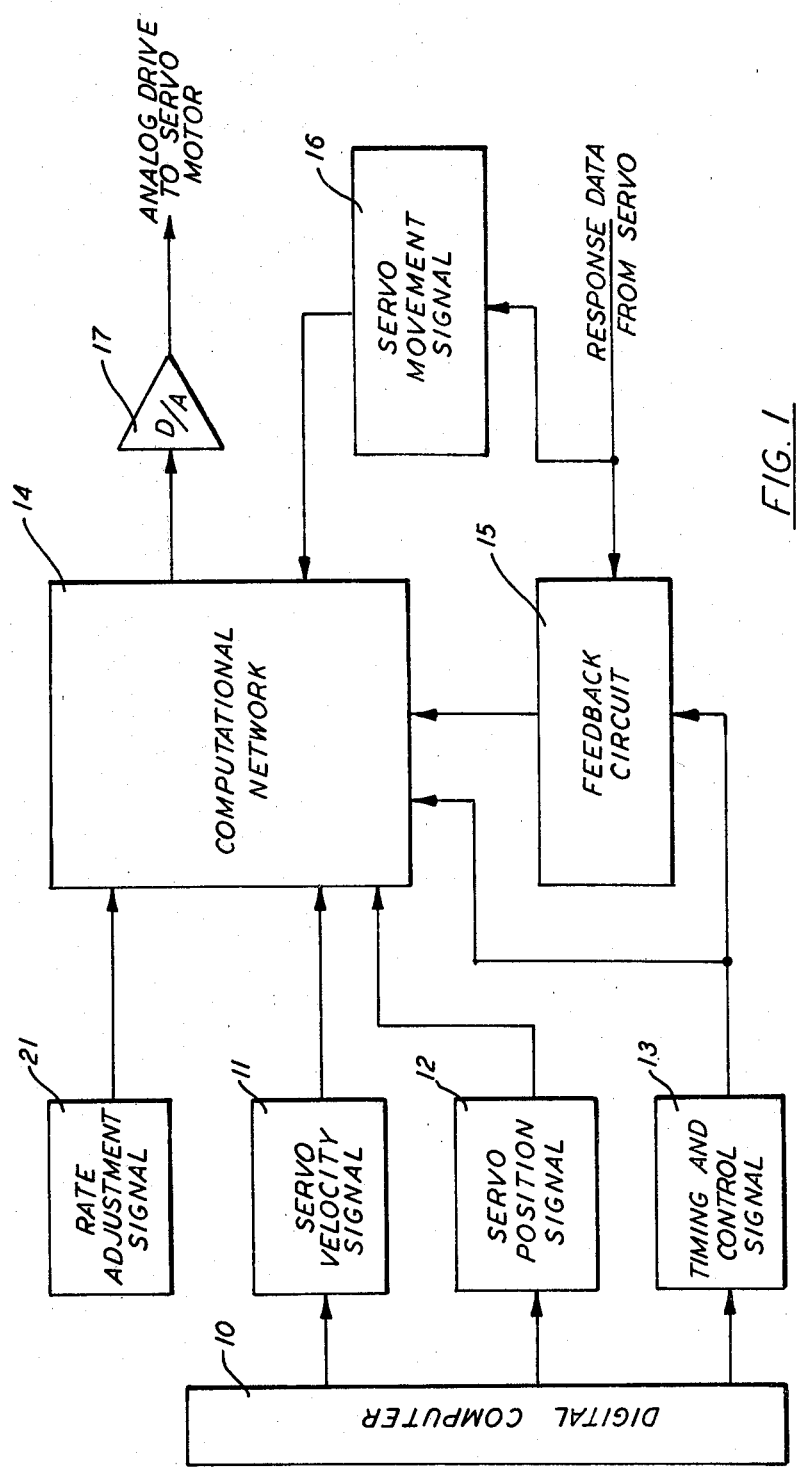
FIG. 1 is a block diagram illustrating the principles of the invention.

For the purpose of orientation, reference is made to FIG. 1 of the drawings, where the reference numeral 10 identifies a digital computer. The computer 10 furnishes appropriate control signals to circuits indicated by the reference numerals 11, 12 and 13.

For example, the circuit 11 is to receive an appropriate "servo velocity" signal from the computer 10, to indicate how fast a servo (not shown) is to move. The circuit 12, in contrast, receives from the computer 10 an appropriate signal to indicate the desired new position for the servo.

The signal connected to the circuit 12 is indicative of the latest information available, in accordance with the information stored in the computer 10, for the "position" of the servo. The purpose of this information, and more details, will be described presently concerning these two circuits 11 and 12. The digital data from the computer 10 which is indicative of servo "position" input command and servo "velocity" input command are received separately so that finer control and more accurate adjustments may be accomplished.

The internal clocking system of the computer 10 furnishes an appropriate signal to a circuit 13 for the purpose of timing and control of the entire operation of all of the component circuits. An appropriate timing and control signal from the circuit 13 is connected to a computational network 14 and, also, to a feedback circuit 15.

An appropriate signal from the servo indicating its "present actual" position is connected to the feedback circuit 15 by way of a "response" data connection, which signal, after being properly timed by a signal from the circuit 13, is connected directly to the computational network 14 in order to adjust any deviation of the servo movement from the commanded movement. This signal from the servo is connected also to a servo movement indicating circuit 16 to tell the computational network 14 when a limit is reached.

A principal purpose of the computational network 14 is to develop a delta signal, or "correctional" signal, from all of the information available in order to obtain a single digital signal to accomplish a desired movement in the electrical servo. Such an accurate signal is connected directly to an appropriate digita-to-analog converter circuit 17 for developing an appropriate and a corresponding analog drive signal for connection to the electrical servo.

Figure 2:
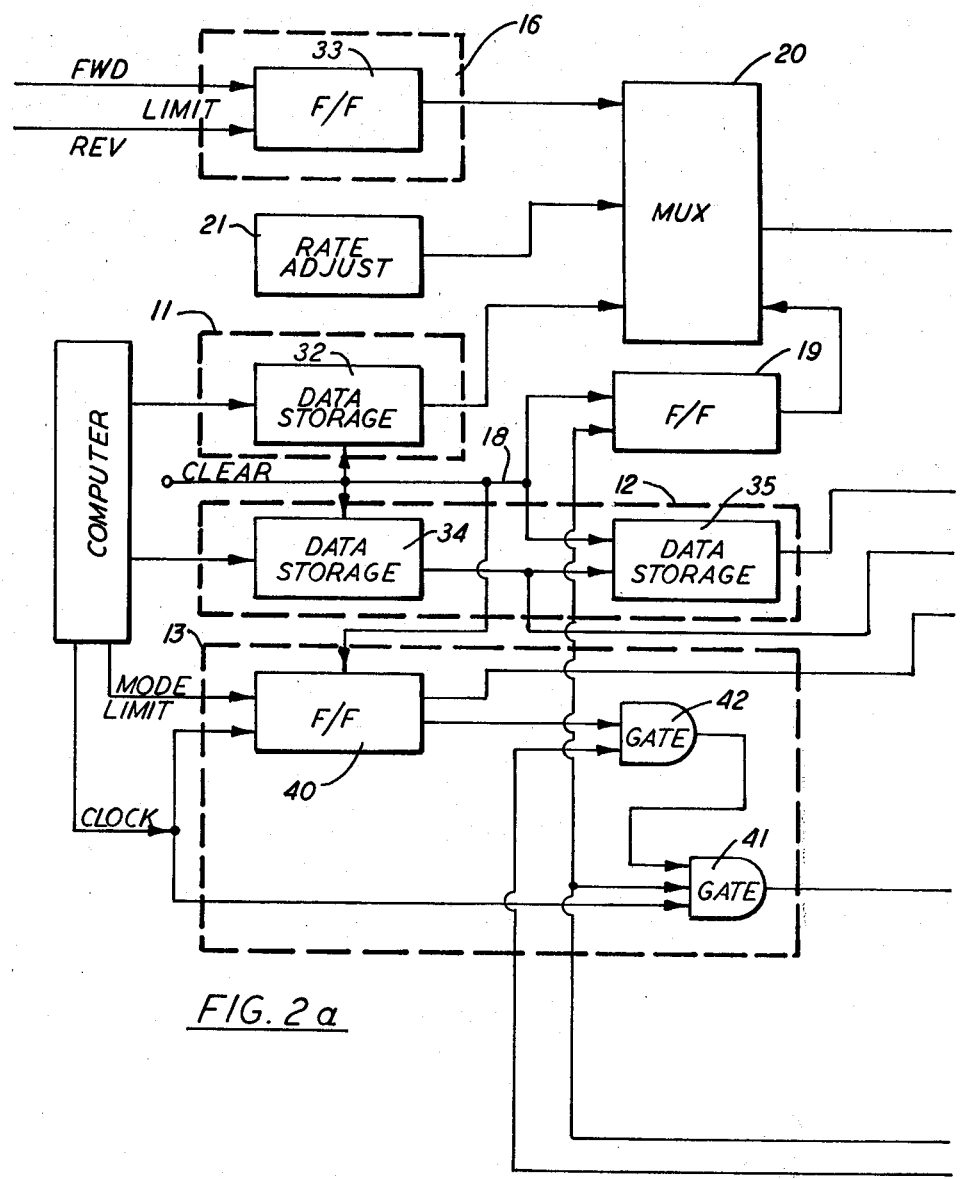
Figure 2:
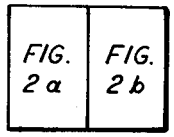
Figure 2B:
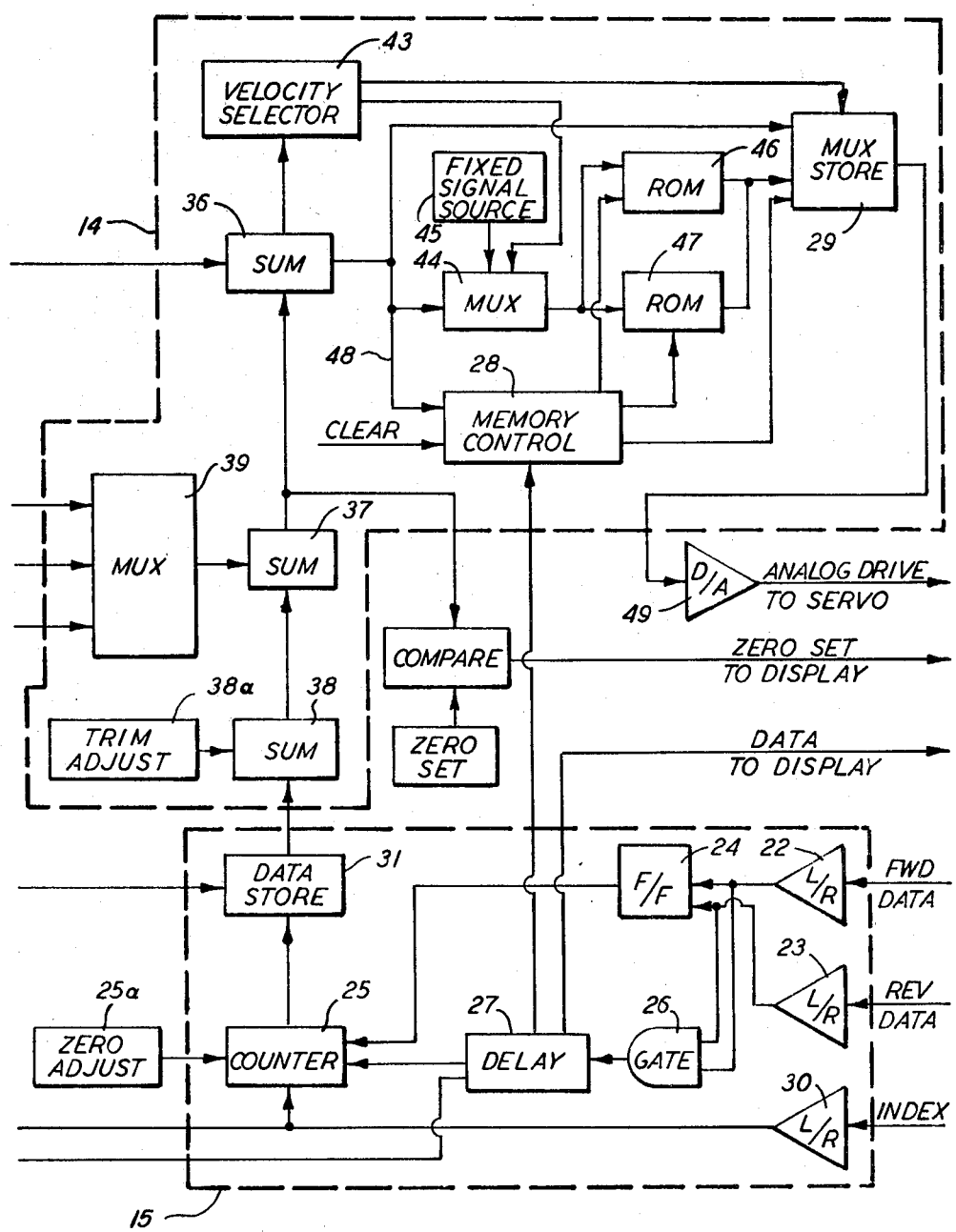

Referring now more particularly to the circuit diagram shown in FIG. 2 of the drawings, before initiation of activity for the circuit, a "clear" signal is generated by an automatic "power on" reset circuit over a connection 18 in order to reset (or set to "0") certain circuits to which it is connected. A multiplexer circuit 20 will select an input from a rate adjustment circuit 21 to generate a sort of "taxi" signal, which is sufficient to cause the servo to move at a fixed, slow speed.

As the servo moves, data (or information) is returned from the servo on one of two lines, depending upon the direction of motion. For example, a line receiver circuit 22 receives data from the servo indicative of movement in one direction, whereas a line receiver circuit 23 will receive data) indicative of movement in a reverse (or opposite) direction.

Position indicators on the servo will set a flip-flop circuit 33 one way or the other, depending upon the direction of movement of the servo, when a physical limit of servo movement is reached; whereupon the multiplexer circuit 20 will stop servo movement efforts and back it up slightly. The other input to the multiplexer circuit 20 is the fixed rate, or "taxi", signal from the circuit 21, described above.

A flip-flop circuit 24 receives information from the circuit 22, or from the circuit 23, in order to generate an appropriate signal to direct the operation of a counter circuit 25. For example, as the servo moves, it generates a regular, timed, sequence of pulses, and it is these pulses that are received at the line receiver circuit 22 and the line receiver circuit 23.

The sequence of pulses is connected also to a gating circuit 26, the output of which, after a fixed delay in a delay circuit 27, generates a signal which is connected directly to a memory control circuit 28 to generate a regular, repeated enabling signal for a multiplexer storage circuit 29.

The servo continues to move until it reaches a reference, or index position where its output is a reference pulse, different from the others, which reference pulse is connected to an index line receiver circuit 30.

An output signal from the line receiver circuit 30 initiates operation of a counter circuit 25 and, also, enables operation of a data storage circuit 31 through a gate circuit 41. In addition, the output signal from the line receiver circuit 30 resets the flip-flop circuit 19 which causes the multiplexer circuit 20 to select the "velocity" input from a data storage circuit 32 already cleared by the initial "clear" signal.

Since the value of the signal generated at the servo relating to its actual position may require a small adjustment, a "zero adjustment" circuit 25a is connected to the counter circuit 25. This activity effectively pre-sets the counter circuit 25 to the correct electrical value corresponding to the servo mechanical "index" position.

This value is passed through the "adder" circuit 38 where a "trim adjustment" circuit 38a develops a correctional signal which is added in the circuit 38 in order to correct for mechanical offsets. Then, the adjusted value goes to the "adder" circuit 37 where "new position" data is added (initially, "new position" data is zero due to the storage circuits 34 and 35 being "cleared", as described above).

The "adder" circuit 36 gets the value next, where the "velocity" signal value is added indicative of how fast the servo is to move to the "new position". Initially, this signal value is zero also, because of the "clear" signal described above.

The servo will move until the output value of the "adder" circuit 36 returns to zero and then will halt in the mechanical "index" position. Thereafter, normal operation of the system is initiated by the computer 10 placing "velocity" and "position" data in the data storage circuits 11 and 12, respectively. This action is accomplished and synchronized by the computer-originated clock.

Information from the computer 10 concerning the "velocity" of servo movement desired for the servo is stored in a data storage circuit 32.

There are two "data storage" circuits for the "position" data, depending upon whether the present or the previous "position" information is needed for a particular servo motion. For example, "present" information is stored first in data storage circuit 34 from which it may advance to a data storage circuit 35 to indicate the previous "position", when the data information stored in the first storage 34 is updated.

Upon the setting of flip-flop circuit 19, the multiplexer circuit 20 is "enabled" and, thereupon, emits an output to the "adder" circuit 36 for summation with the information from the "adder" circuit 37 and also from the "adder" circuit 38. The information to the "adder" circuit 37 is received from a multiplexer circuit 39 which is indicative of the present "new position" for the servo (as determined by the computer 10) or the immediately past "new position" depending upon the signal from a flip-flop circuit 40.

Movement of the servo is initiated by either one or both of the following conditions:

A. The output of the "adder" circuit 37 (a comparison of the servo mechanical "actual" position and the computer-determined "new" position) is not zero, and-/or B. The output of the "adder" circuit 36 (a comparison of position error data, (A) above, and velocity command data from the multiplexer circuit 28) is not zero.

The servo will move in obedience to the non-zero value of (B) (in a direction to cause (B) to become 'ZERO').

Therefore, if the flip-flop circuit 40 is set in one direction, the output from the data storage circuit 34 is selected by the multiplexer circuit 39 for connection to the "adder" circuit 37. In contrast, if the flip-flop circuit 40 is set in the other direction, the output of the "data storage" circuit 35 is selected, by the multiplexer circuit 39, for connection to the "adder" circuit 37.

Whether the flip-flop circuit 40 is set for selecting the information stored in the data storage circuit 34 or in the data storage circuit 35 is dependent upon the particular mode as determined from the computer 10, in conjunction with a timing clock pulse control signal also from the computer 10. For example, the particular mode of servo operation may be continuous, intermittent, step or some other motion.

Information in the data storage circuit 31 relates to the actual position of the servo put in a time frame as determined by the computer 10 in order to produce an output for the "adder" circuit 38. In other words, a signal from the counter circuit 25 relates to the actual present "position" of the servo, and the data storage circuit 31 puts this signal into a timing relationship with "position" data by the computer clock through the gate circuit 41.

Then, after the signal output from the counter circuit 25 is put in the computer time frame in the circuit 31, the output signal from the circuit 31 may require another adjustment. Such adjustment is done in the "adder" circuit 38 by combining the output signal from the circuit 31 with a "trim adjustment" from the circuit 38a.

In the "adder" circuit 37, the desired (or "commanded") position of the servo, as determined by the output from the computer 10, is combined with the "actual" servo position, in order to provide a signal for the "adder" circuit 36 where the desired velocity is added to provide an output for a velocity selector circuit 43. The velocity selector circuit 43 serves to select a velocity factor in order to drive the servo.

The velocity selector circuit 43 examines the output of the "adder" circuit 36 and generates an enabling signal for a multiplexer circuit 44 to select a fixed signal from a circuit 45 to enable a multiplexer circuit 29 to select the output of the "adder" circuit 36.

The output of the "adder" circuit 36 is connected to a multiplexer circuit 44 from where it becomes an enabling input for one of the "Read-Only-Memory" circuits 46 or 47 as determined by the "most significant bit" of data over the line 48 to a memory control circuit 28 to determine which of the ROM circuits 46 or 47 is to be selected. Each of the "Read-Only-Memory" circuits 46 and 47 contains 1024 words, each word being the square root of a velocity value.

One "Read-Only-Memory" circuit contains positive values; the other circuit contains negative values. The memory control circuit 28 causes the multiplexer circuit 29 to select the memory output and connect the value of the "digital-to-analog converter" circuit 49 which drives the servo.

It will be clear to one skilled in the art that a "servo", or a "servo motor", can be any one of several different types, all of which can be used with the invention, and while a "rotary" type of servo is contemplated in the above description, the digital control circuit of the invention can be used equally with "pivotable" and "reciprocal" servos also.

Although the invention has been disclosed using flip-flop circuits, data storage devices, gates, counters and other specifically identified circuit components, it may also be practiced by using the logic elements in a digital computer along with a proper program. Any number of possible combinations of computer logic and hardware are possible without deviating from the true spirit and scope of the present invention which is intended to be defined by the claims appended hereto.

We claim:

1. In a simulator training apparatus having a plurality of operations controlled in response to information from a digital computer and at least some of said operations having moveable parts connected for movement by an analog drive servo motor, a digital control circuit to actuate said analog servo motor in response to said digital information, comprising:

control means responsive to a clocked timing signal from said digital computer for timing and control of the other component circuits of said digital control circuit, means to receive digital information from said computer to provide a digital signal indicative of a new servo position, separate means to receive digital information from said computer to provide a digital signal indicative of a velocity of movement, feedback circuit means including means to receive information from said servo indicative of actual present servo position, computational circuit means to generate a digital output signal responsive to digital information from each of said means to receive, from said control means, and from said feedback circuit means, so that said digital output signal is sufficient to cause said servo to move from its actual present position to said new servo position in a predetermined manner, and digital-to-analog converter circuit means to convert said digital output signal from said computational circuit means into analog form to actuate said analog servo motor in said predetermined manner.

2. In a simulator training apparatus as set forth in claim 1 wherein said control means includes circuit means to coordinate said actual servo position with said clocked timing signal from said computer to derive information as to when said new position is reached.

3. In a simulator training apparatus as set forth in claim 1 including separate circuit means to distinguish between forward and reverse directions of servo movement.

4. In a simulator training apparatus as set forth in claim 1 wherein said control means includes means to determine a limit to the movement initiated by said output signal.

5. In a simulator training apparatus set forth in claim 1 wherein said computational circuit means includes means to select one from a plurality of signals each having a predetermined, fixed value for an input signal to drive said servo.

6. In a simulator training apparatus set forth in claim 5 wherein at least some of said plurality of signals is from Read-Only-Memory circuit means.

* * * * *